United States Patent
Schmidtke et al.

(10) Patent No.: US 11,685,696 B2
(45) Date of Patent: Jun. 27, 2023

(54) PROCESS FOR PRODUCING AN AQUEOUS DISPERSION AND REDISPERSIBLE DISPERSION POWDER PRODUCED THEREFROM

(71) Applicant: BASF SE, Ludwigshafen am Rhein (DE)

(72) Inventors: Christian Schmidtke, Trostberg (DE); Ekkehard Jahns, Ludwigshafen (DE); Torben Gaedt, Trostberg (DE); Martin Winklbauer, Trostberg (DE); Klaus Seip, Ludwigshafen (DE); Iris Loescher, Trostberg (DE)

(73) Assignee: BASF SE

( * ) Notice: Subject to any disclaimer, the term of this patent is extended or adjusted under 35 U.S.C. 154(b) by 0 days.

(21) Appl. No.: 16/620,361

(22) PCT Filed: Jun. 6, 2018

(86) PCT No.: PCT/EP2018/064815
§ 371 (c)(1),
(2) Date: Dec. 6, 2019

(87) PCT Pub. No.: WO2018/224519
PCT Pub. Date: Dec. 13, 2018

(65) Prior Publication Data
US 2020/0207671 A1 Jul. 2, 2020

(30) Foreign Application Priority Data

Jun. 9, 2017 (EP) .................................... 17175242

(51) Int. Cl.
| | | |
|---|---|---|
| *C04B 40/00* | (2006.01) | |
| *C04B 26/06* | (2006.01) | |
| *C04B 103/00* | (2006.01) | |
| *C04B 111/00* | (2006.01) | |
| *C04B 111/62* | (2006.01) | |
| *C04B 111/70* | (2006.01) | |
| *C04B 111/72* | (2006.01) | |

(52) U.S. Cl.
CPC .......... *C04B 40/0042* (2013.01); *C04B 26/06* (2013.01); *C04B 40/0046* (2013.01); *C04B 2103/0057* (2013.01); *C04B 2111/00482* (2013.01); *C04B 2111/00637* (2013.01); *C04B 2111/00672* (2013.01); *C04B 2111/62* (2013.01); *C04B 2111/70* (2013.01); *C04B 2111/72* (2013.01)

(58) Field of Classification Search
CPC . C04B 40/0042; C04B 26/06; C04B 40/0046; C08L 23/00; C08L 31/00; C08L 41/00
See application file for complete search history.

(56) References Cited

U.S. PATENT DOCUMENTS

| | | |
|---|---|---|
| 4,269,749 A | 5/1981 | Marriott et al. |
| 4,733,005 A | 3/1988 | Schmidt et al. |
| 5,922,796 A | 7/1999 | Colombet et al. |
| 6,036,887 A | 3/2000 | Guerin et al. |
| 6,242,512 B1 | 6/2001 | Figge et al. |
| 6,441,082 B1 | 8/2002 | Weitzel et al. |
| 2010/0081736 A1 | 4/2010 | Willimann et al. |

FOREIGN PATENT DOCUMENTS

| | | |
|---|---|---|
| CN | 1535995 A | 10/2004 |
| CN | 106459652 A | 2/2017 |
| DE | 43 20 220 A1 | 12/1994 |
| DE | 196 01 699 A1 | 7/1997 |
| DE | 197 18 289 A1 | 11/1998 |
| EP | 1 923 405 A1 | 5/2008 |
| WO | WO 97/26295 A1 | 7/1997 |
| WO | WO 99/25780 A1 | 5/1999 |
| WO | WO 03/097721 A1 | 11/2003 |

OTHER PUBLICATIONS

International Search Report dated Aug. 31, 2018 in PCT/EP2018/064815 filed Jun. 6, 2018, 2 pages.
Moritz et al., "Kinetic Studies of Steric Stabilized Emulsion Polymerization of Vinyl Acetate", 1985, pp. 524-528.

*Primary Examiner* — Wenwen Cai
(74) *Attorney, Agent, or Firm* — Faegre Drinker Biddle & Reath LLP

(57) ABSTRACT

The present invention relates to a process for producing a redispersible dispersion powder, to the redispersible dispersion powder obtainable by this process, to an aqueous dispersion obtainable by step (1) of this process, and to a building material composition comprising the redispersible dispersion powder and/or the aqueous dispersion, to the use of the redispersible dispersion powder in a building material composition and to the use of the aqueous dispersion for production of a redispersible dispersion powder.

10 Claims, No Drawings

PROCESS FOR PRODUCING AN AQUEOUS DISPERSION AND REDISPERSIBLE DISPERSION POWDER PRODUCED THEREFROM

The present invention relates to a process for producing a redispersible dispersion powder, to the redispersible dispersion powder obtainable by this process, to an aqueous dispersion obtainable by step (1) of this process, and to a building material composition comprising the redispersible dispersion powder and/or the aqueous dispersion, to the use of the redispersible dispersion powder in a building material composition and to the use of the aqueous dispersion for production of a redispersible dispersion powder.

Aqueous dispersions comprising polymer particles are used in building material compositions in order to improve the flexibility, bonding properties and/or flowability of the building material compositions.

However, aqueous dispersions are disadvantageous because the building material compositions are generally required as dry mixes. Furthermore, aqueous dispersions are disadvantageous with regard to storage (for example through frost damage, microorganism infestation etc.) and transport. Especially in the case of prolonged storage, dispersed polymer particles that were originally homogeneously distributed can agglomerate and hence prevent homogeneous distribution of the polymer particles in the building material composition. What are therefore being sought are dispersion powders that are redispersible and comprise polymer particles in order, as already set out above, to improve the flexibility, bonding properties and/or flowability of the building material compositions.

A particularly appropriate method for converting an aqueous dispersion to a redispersible dispersion powder is spray drying. This involves spraying and dewatering the aqueous dispersion in a hot air stream. In order to assure spray drying of the dispersion and redispersibility of the dispersion powder, a spraying aid is added to the aqueous dispersion.

Redispersible dispersion powders therefore typically comprise polymer particles and a water-soluble spraying aid. It is also possible for emulsifiers to be present.

U.S. Pat. No. 5,922,796 A describes a redispersible dispersion powder comprising a powder of a water-insoluble, film-forming polymer obtainable from at least one ethylenically unsaturated monomer, at least one nonionic emulsifier and at least one water-soluble compound selected from polyelectrolytes that are among the weak polyacids and comprise carboxyl groups as acid groups. U.S. Pat. No. 6,036,887 A describes redispersible granules comprising at least one active material in the form of a hydrophobic liquid, at least one nonionic emulsifier and at least one water-soluble compound selected from polyelectrolytes that are among the weak polyacids and comprise carboxyl groups as acid groups.

WO 03/097721 A1 describes the use of water-soluble polymers consisting of monomers bearing monoethylenically unsaturated acid groups in acidic or partly or fully neutralized form and further monomers copolymerized with these monomers as drying agents for the production of redispersion powder and/or pulverulent polymeric dispersants. It is described as preferable that the acid groups of the monomers are at least partly neutralized before, during or after polymerization.

WO 97/26295 A1 discloses redispersible polymer powders based on a mixture of water-insoluble polymer and a water-soluble polymeric protective atomization colloid which comprises carboxylic acid groups and is in non-neutralized or partly neutralized form.

DE 43 20 220 A1 discloses the use of polymers formed from acrylamide or acrylic ester monomers that bear a sulfonic acid group in the side chain, and further free-radically copolymerizable monomers as auxiliaries in the spray drying of aqueous dispersions.

However, the spraying aids described in the prior art have disadvantages. For example, they are unsuitable for the spray drying of particular aqueous dispersions or discolor the dispersion powder. In particular, however, there is still room for improvement in terms of the redispersibility of the dispersion powders. Furthermore, there is a great need to improve the use properties of the redispersible dispersion powders such that the building material made up with the redispersible dispersion powder has good processability, and especially has an optimal pot life of about 0.5 h-2 h.

It was therefore an object of the present invention to provide an improved process for producing redispersible dispersion powders and dispersion powders that have particularly good redispersibility with improved use properties.

This object is achieved by the process of the invention for producing a redispersible dispersion powder, comprising the steps of
(1) mixing at least
  (i) an aqueous dispersion, where the dispersion comprises particles, where the particles comprise at least one polymer I, where the polymer I comprises monomer units formed from at least one ethylenically unsaturated monomer; and
  (ii) a polyacid II comprising monomer units formed from at least one ethylenically unsaturated monomer comprising a sulfonic acid group or a salt from this group;
wherein, in step (1), an additive comprising a polyoxyalkylene group, preferably a polyoxyethylene group where the degree of ethoxylation is 6 to 50, is present, wherein the additive
(a) is mixed into the mixture from step (1) as a further component, or
(b) is applied in a preceding step by emulsion polymerization on the surface of the particles, or
(c) is incorporated in a preceding step as a monomer unit into the polymer I of the particles; and wherein the dispersion resulting from step (1) has a pH of <4;
(2) drying the dispersion resulting from step (1) in order to obtain the redispersible dispersion powder.

It has been found that, surprisingly, the production of redispersible dispersion powders can be improved when a polyacid II is used as spraying aid and the spray drying is conducted at a pH of <4. This is probably attributable to the improvement in formation of hydrogen bonds between the particles comprising the polymer I and the polyacid II as a result of the acidic pH. This effect can be further enhanced when an additive comprising a polyoxyalkylene group that acts as emulsifier is added. It is assumed that a protective shell is formed around the particles in this way, and this protects the particles from filming during the spray drying.

The present invention further relates to a redispersible dispersion powder obtainable by the process of the invention. Preferably, an antiblocking agent is also added to the redispersible dispersion powder obtained by the process of the invention during the drying and/or after the drying, in order to prevent irreversible agglomerating of the polymer particles of the redispersible dispersion powder.

The redispersible dispersion powder of the invention is notable for particularly good redispersibility. This improved property is probably attributable to the protective shell composed of the polyacid and optionally the emulsifier around the particles that has arisen from the process of the invention.

The invention further relates to an aqueous dispersion obtainable by step (1) of the process.

The dispersion is particularly advantageous for the production of the redispersible dispersion powder owing to the low pH for the reasons elucidated above.

The invention further relates to a building material composition comprising
the redispersible dispersion powder of the invention, and/or
the aqueous dispersion of the invention.

The building material composition has improved properties with regard to processability, flexibility, adhesion and possibly flowability.

The invention also further relates to the use of the redispersible dispersion powder of the invention in a building material composition.

The invention also further relates to the use of the aqueous dispersion of the invention for production of a redispersible dispersion powder.

The invention is described in detail hereinafter. In this connection, the terms which follow are of significance.

The term "% by weight" (also called proportion by mass) denotes the percentage of the respective component in relation to the sum total of all components measured by weight, unless another basis is stated. The term "% by volume" denotes the percentage of the respective component in relation to the sum total of all components measured by volume, unless another basis is stated. In addition, the sum total of all percentages of the specified and unspecified components of a composition is always 100%.

The term "comprising" means that, as well as the features specified, there may also be further, unspecified features. The term "consisting of" means that only the features specified are present.

The preferred embodiments of the invention are elucidated hereinafter. The preferred embodiments are preferred alone and in combination with one another.

As already mentioned above, the invention relates, in one embodiment, to a process for producing a redispersible dispersion powder, comprising the steps of
(1) mixing at least
  (i) an aqueous dispersion, where the dispersion comprises particles, where the particles comprise at least one polymer I, where the polymer I comprises monomer units formed from at least one ethylenically unsaturated monomer; and
  (ii) a polyacid II comprising monomer units formed from at least one ethylenically unsaturated monomer comprising a sulfonic acid group or a salt from this group;
wherein, in step (1), an additive comprising a polyoxyalkylene group, preferably a polyoxyethylene group where the degree of ethoxylation is 6 to 50, is present, wherein the additive
(a) is mixed into the mixture from step (1) as a further component, or
(b) is applied in a preceding step by emulsion polymerization on the surface of the particles, or
(c) is incorporated in a preceding step as a monomer unit into the polymer I of the particles; and wherein the dispersion resulting from step (1) has a pH of <4;
(2) drying the dispersion resulting from step (1) in order to obtain the redispersible dispersion powder.

The term "redispersible dispersion powder" or "redispersible powder" denotes a polymer in powder or particle form that can be redispersed when a solvent, especially a polar solvent such as water, for example, is added. The redispersible dispersion powders or the dispersion that results with the solvent, preferably with water, can be used in building material compositions in order to improve the processability, flexibility, bonding properties and/or flowability of the building material compositions.

Typically, the polymer particles of the redispersible dispersion powder are obtained by emulsion polymerization. This is a process for free-radical polymerization of hydrophobic monomers in an aqueous phase. Preference is given to solubilizing the hydrophobic monomers by adding emulsifiers. Suitable emulsifiers are described further down and especially include those having a polyoxyalkylene group. Typically, the emulsifiers that are added in the emulsion polymerization remain stuck to the surface of the polymer particles formed, such that the emulsifier is applied by the emulsion polymerization on the surface of the particles. A water-soluble initiator is also added to initiate the polymerization. Typical initiators include thermally decomposing free-radical formers, e.g. peroxides such as $Na_2S_2O_8$ or $(NH_4)_2S_2O_8$ or azo compounds, photochemically decomposing free-radical formers, e.g. azobis(isobutyronitrile) (AIBN), or free-radical formers that result from redox reactions, for example the combination of ammonium peroxodisulfate and ascorbic acid. After the emulsion polymerization, a drying process is conducted in order to obtain the redispersible dispersion powder. Suitable drying processes are described further down. In order to assure drying of the dispersion and redispersibility of the dispersion powder, a spraying aid is added to the aqueous dispersion. Suitable spraying aids for the process of the invention for producing the redispersible dispersion powders are described further down. After the drying, the desired polymer particles are obtained in combination with the spraying aid.

The term "particles" or "polymer particles" in connection with the redispersible dispersion powder of the invention relates to polymer particles having a particular particle size $D_x$ based on a particle size distribution where x % of the particles have a diameter less than the $D_x$ value. The $D_{50}$ particle size is the median value of the particle size distribution. The particle size distribution can be measured, for example, by means of dynamic light scattering ISO 22412: 2008. The particle size distribution can be reported as volume distribution, surface distribution or numerical distribution. According to the present invention, the $D_x$ value relates to the numerical distribution, where x % of the total number of particles has a smaller diameter. Preferably, a $D_{50}$ of the particles in the dispersion resulting from step (1) is from 50 to 1000 nm.

Owing to reversible agglomeration of the particles during the drying, the $D_{50}$ of the particles of the redispersible dispersion powder is greater, and a $D_{50}$ of 10 to 300 µm is preferred for the particles of the redispersible dispersion powder. The particle size measurement of the dispersion powders is based on optically dynamic digital image processing. A dispersed particle stream passes through two LED stroboscope light sources, with detection of the shadows projected by the particles by two digital cameras. The dry measurement is effected with the Camsizer XT instrument from Retsch GmbH using a dispersion pressure of 50 kPa.

The particles of the redispersible dispersion powder of the invention comprise at least one polymer I comprising monomer units formed from at least one ethylenically unsaturated monomer.

The expression "where the polymer I comprises monomer units formed from at least one ethylenically unsaturated monomer" relates to a polymer I that derives from at least one ethylenically unsaturated monomer. In the polymerization, the ethylenically unsaturated double bonds are converted to the polymer chain in that, for example, a free radical breaks the C═C double bond (chain initiation) and the resultant free radical with a C—C single bond attacks the closest ethylenically unsaturated monomer at the C═C double bond and so forth, such that a polymer chain is formed (growth reaction), until the meeting of two free radicals results in chain termination. The monomer units present in the polymer I therefore correspond to the underlying ethylenically unsaturated monomers, apart from the fact that the C═C double bonds, owing to the polymerization, are present only as C—C single bonds and the monomer units are present in a polymer chain.

Preferably, the ethylenically unsaturated monomer according to the present invention is a compound having the following structural formula:

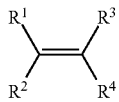

where $R^1$, $R^2$, $R^3$ and $R^4$ are independently selected from the group consisting of —H, —$(C_1-C_6)$alkyl, —$O(C_1-C_6)$alkyl, —$COOR^5$, —$(C_1-C_6)$alkyl$COOR^5$, —$OC(O)(C_1-C_6)$alkyl, —$(C_2-C_6)$alkenyl, and —$(C_6-C_{10})$aryl; and where $R^5$ is —$(C_1-C_6)$alkyl.

The prefix "$C_x-C_y$" denotes the possible number of carbon atoms in the respective group. The expression "$(C_1-C_9)$alkyl" on its own or as part of another group denotes a linear aliphatic carbon chain comprising 1 to 9 carbon atoms or a branched aliphatic carbon chain comprising 4 to 9 carbon atoms. The expression "$(C_1-C_6)$alkyl" on its own or as part of another group denotes a linear aliphatic carbon chain comprising 1 to 6 carbon atoms or a branched aliphatic carbon chain comprising 4 to 6 carbon atoms. Nonlimiting illustrative $(C_1-C_9)$alkyl groups or $(C_1-C_6)$alkyl groups include methyl, ethyl, n-propyl, isopropyl, n-butyl, 2-butyl, isobutyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl, 2-ethylhexyl, n-octyl, isodecyl, 2-propylheptyl, cydohexyl, isononyl, isotridecyl, isopentyl, 3,5,5-trimethyl-1-hexyl, 2-isopropyl-5-methylhexyl. The $(C_1-C_6)$alkyl group may optionally be substituted by one or more substituents independently selected from the group consisting of —F, —Cl, —OH and —$CF_3$.

The expression "$(C_2-C_6)$alkenyl" denotes a linear or branched alkyl group having 2, 3, 4, 5 or 6 carbon atoms and having one, two or three carbon-carbon double bonds. In one embodiment, the $(C_2-C_6)$alkenyl has one carbon-carbon double bond. Nonlimiting illustrative $(C_2-C_6)$alkenyl groups include vinyl (ethenyl), 1-propenyl, 1-butenyl, 2-butenyl, 3-butenyl, 1-pentenyl and 1-hexenyl. The $(C_2-C_6)$alkenyl group may optionally be substituted by one or more substituents independently selected from the group consisting of —F, —Cl, —OH and —$CF_3$.

The expression "$(C_6-C_{10})$aryl" denotes mono- or bicyclic aromatic compounds having 6 or 10 carbon atoms. Nonlimiting illustrative $(C_6-C_{10})$aryl groups include phenyl and naphthyl. The $(C_6-C_{10})$aryl group may optionally be substituted by one or more substituents independently selected from the group consisting of —F, —Cl, —OH and —$CF_3$, —$(C_1-C_6)$alkyl or —$O(C_1-C_6)$alkyl.

It is optionally further possible to use minor amounts, for example less than 10% by weight, preferably less than 8% by weight, more preferably less than 6% by weight, of auxiliary monomers.

Examples of these further monomers are ethylenically unsaturated mono- and dicarboxylic acids, such as acrylic acid, methacrylic acid, itaconic acid, fumaric acid and maleic acid, aconitic acid, mesaconic acid, crotonic acid, citraconic acid, acryloyloxypropionic acid, methacryloyloxypropionic acid, vinylacetic acid, monomethyl itaconate, monomethyl fumarate, monobutyl fumarate, acrylic anhydride, methacrylic anhydride, maleic anhydride or itaconic anhydride, acrylamidoglycolic acid and methacrylamidoglycolic acid, acrylamide, methacrylamide and isopropylacrylamide, substituted (meth)acrylamides, for example N,N-dimethylamino(meth)acrylate; 3-dimethylamino-2,2-dimethylprop-1-yl (meth)acrylate, N,N-dimethylaminomethyl(meth)acrylamide, N-(4-morpholinomethyl)(meth)acrylamide, diacetoneacrylamide; acetoacethoxyethyl methacrylate; N-methylol(meth)acrylamide, polyethylene oxide (meth)acrylate, methoxy polyethylene oxide (meth)acrylate, acrolein, methacrolein; N-(2-methacryloyloxyethyl)ethyleneurea, 1-(2-(3-allyloxy-2-hydroxypropylamino)ethyl)imidazolidin-2-one, ureido (meth)acrylate, 2-ethyleneureidoethyl methacrylate.

The following auxiliary monomers are also suitable: ethylenically unsaturated, hydroxyalkyl-functional comonomers such as hydroxy$(C_1-C_5)$alkyl methacrylates and acrylates such as hydroxyethyl, hydroxypropyl and 4-hydroxybutyl acrylate, hydroxyethyl (meth)acrylate and hydroxypropyl (meth)acrylates, 4-hydroxybutyl (meth)acrylate, glycidyl (meth)acrylate, and also N-vinylpyrrolidone and vinylimidazole.

Particular preference is given to acrylic acid, methacrylic acid, acrylamide, hydroxyethyl (meth)acrylate and hydroxypropyl (meth)acrylate.

Further examples of the auxiliary monomers are phosphorus-containing monomers, for example vinylphosphonic acid and allylphosphonic acid. Also suitable are the mono- and diesters of phosphonic acid and phosphoric acid with hydroxyalkyl (meth)acrylates, specifically the monoesters. Also suitable are diesters of phosphonic acid and phosphoric acid monoesterified with a hydroxyalkyl (meth)acrylate and additionally monoesterified with a different alcohol, for example an alkanol. Suitable hydroxyalkyl (meth)acrylates for these esters are those mentioned hereinafter as separate monomers, especially 2-hydroxyethyl (meth)acrylate, 3-hydroxypropyl (meth)acrylate and 4-hydroxybutyl (meth)acrylate. Corresponding dihydrogenphosphate ester monomers include phosphoalkyl (meth)acrylates such as 2-phosphoethyl (meth)acrylate, 2-phosphopropyl (meth)acrylate, 3-phosphopropyl (meth)acrylate, phosphobutyl (meth)acrylate and 3-phospho-2-hydroxypropyl (meth)acrylate. Also suitable are the esters of phosphonic acid and phosphoric acid with alkoxylated hydroxyalkyl (meth)acrylates, for example the ethylene oxide condensates of (meth)acrylates, such as $H_2C$═$C(CH_3)COO(CH_2CH_2O)_nP(OH)_2$ and $H_2C$═$C(CH_3)COO(CH_2CH_2O)_nP(═O)(OH)_2$ where n is 1 to 50. Also suitable are phosphoalkyl crotonates, phosphoalkyl maleates, phosphoalkyl fumarates, phosphodialkyl (meth)acrylates, phosphodialkyl crotonates and allyl phosphates. Further suitable monomers comprising phosphorus groups are described in WO 99/25780 and U.S. Pat. No. 4,733,005, hereby incorporated by reference.

Additionally suitable are vinylsulfonic acid, allylsulfonic acid, sulfoethyl acrylate, sulfoethyl (meth)acrylate, sulfopropyl acrylate, sulfopropyl (meth)acrylate, 2-hydroxy-3-acryloyloxypropylsulfonic acid, 2-hydroxy-3-methacryloyloxypropylsulfonic acid, styrenesulfonic acids and 2-acrylamido-2-methylpropanesulfonic acid. Suitable styrenesulfonic acids and derivatives thereof are styrene-4-sulfonic acid and styrene-3-sulfonic acid and the alkaline earth metal or alkali metal salts thereof, for example sodium styrene-3-sulfonate and sodium styrene-4-sulfonate, poly (allyl glycidyl ethers) and mixtures thereof, in the form of various products named Bisomer® from Laporte Performance Chemicals, UK. These are, for example, Bisomer® MPEG 350 MA, a methoxy polyethylene glycol monomethacrylate.

The functional groups of the monomers play a part in imparting the colloidal stabilization of the composition, particularly when the formulation as a whole also comprises fillers, for example calcium carbonate. Crosslinking here takes place either via interreaction or via addition of a further crosslinking agent. Crosslinking preferably takes place only after actual film formation.

In a preferred embodiment, the polymer I comprises monomer units formed from at least one ethylenically unsaturated monomer selected from the group consisting of ethylene, propylene, butadiene, styrene, vinyl acetate, vinyl chloride, vinyl ethers, vinyl esters, acrylic esters, methacrylic esters, and mixtures of the aforementioned monomers.

In a preferred embodiment, the polymer I is selected from the group consisting of
(ia) styrene-(meth)acrylate copolymers,
(ib) styrene-butadiene copolymers,
(ic) (meth)acrylate copolymers, and
(id) ethylene-vinyl acetate copolymers.

Particular preference is given to styrene-(meth)acrylate copolymers.

In a further particularly preferred embodiment, the polymer I is a styrene-2-ethylhexyl acrylate copolymer, a styrene-n-butyl acrylate copolymer or a styrene-butadiene copolymer.

According to the invention, the spraying aid used is a polyacid II comprising monomer units formed from at least one ethylenically unsaturated monomer comprising a sulfonic acid group.

Similarly to the manner elucidated in connection with the polymer I, the expression "polyacid II comprising monomer units formed from at least one ethylenically unsaturated monomer comprising a sulfonic acid group or a salt from this group" relates to a polyacid II that derives from at least one ethylenically unsaturated monomer, where the ethylenically unsaturated monomer comprises a sulfonic acid group. As described in connection with the polymer I, the polymerization transforms the ethylenically unsaturated double bonds into the polymer chain.

The monomer units present in the polyacid II therefore correspond to the underlying ethylenically unsaturated monomers, apart from the fact that the C=C double bonds, owing to the polymerization, are present only as C—C single bonds and the monomer units are present in a polymer chain. The sulfonic acid groups are not involved in the polymerization, but are within the side chain of the ethylenically unsaturated monomer.

The "ethylenically unsaturated monomer comprising a sulfonic acid group" is preferably a compound having the following structural formula:

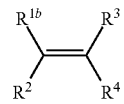

where $R^{1b}$ is selected from the group consisting of —SO$_3$H or a salt thereof, —(C$_1$-C$_6$)alkyl, —O(C$_1$-C$_6$)alkyl, —COOR$^6$, —CONHR$^6$, —(C$_1$-C$_6$)alkylCOOR$^5$, —(C$_1$-C$_6$)alkylCONHR$^5$, —OC(O)(C$_1$-C$_6$)alkyl, —NHC(O)(C$_1$-C$_6$)alkyl, —(C$_2$-C$_6$)alkenyl, and —(C$_6$-C$_{10}$)aryl, where at least one carbon atom from the —(C$_1$-C$_6$)alkyl, —O(C$_1$-C$_6$)alkyl, —COOR$^6$, —CONHR$^6$, —(C$_1$-C$_6$)alkylCOOR$^5$, —(C$_1$-C$_6$)alkylCONHR$^5$, —OC(O)(C$_1$-C$_6$)alkyl, —NHC(O)(C$_1$-C$_6$)alkyl, —(C$_2$-C$_6$)alkenyl, and —(C$_6$-C$_{10}$)aryl groups is substituted by at least one —SO$_3$H group or a salt of this group; and where $R^2$, $R^3$ and $R^4$ are independently selected from the group consisting of —H, —(C$_1$-C$_6$)alkyl, —O(C$_1$-C$_6$)alkyl, —COOR$^5$, —(C$_1$-C$_6$)alkylCOOR$^5$, —OC(O)(C$_1$-C$_5$)alkyl, —(C$_2$-C$_6$)alkenyl, and —(C$_6$-C$_{10}$)aryl;

where $R^5$ is —H or —(C$_1$-C$_9$)alkyl; and where $R^6$ is —(C$_1$-C$_9$)alkyl.

In a further preferred embodiment, $R^{1b}$ is selected from the group consisting of —SO$_3$H or a salt thereof, —(C$_1$-C$_6$)alkyl, —O(C$_1$-C$_6$)alkyl, —COOR$^6$, —(C$_1$-C$_6$)alkylCOOR$^5$, —OC(O)(C$_1$-C$_6$)alkyl, —(C$_2$-C$_6$)alkenyl, and —(C$_6$-C$_{10}$)aryl, where at least one carbon atom from the —(C$_1$-C$_6$)alkyl, —O(C$_1$-C$_6$)alkyl, —COOR$^6$, —(C$_1$-C$_6$)alkylCOOR$^5$, —OC(O)(C$_1$-C$_6$)alkyl, —(C$_2$-C$_6$)alkenyl, and —(C$_6$-C$_{10}$)aryl groups is substituted by at least one —SO$_3$H group or a salt from this group; and where $R^2$, $R^3$ and $R^4$ are independently selected from the group consisting of —H, —(C$_1$-C$_6$)alkyl, —O(C$_1$-C$_6$)alkyl, —COOR$^5$, —(C$_1$-C$_6$)alkylCOOR$^5$, —OC(O)(C$_1$-C$_6$)alkyl, —(C$_2$-C$_6$)alkenyl, and —(C$_6$-C$_{10}$)aryl;

where $R^5$ is —H or —(C$_1$-C$_9$)alkyl; and where $R^6$ is —(C$_1$-C$_9$)alkyl.

In a preferred embodiment, $R^{1b}$ is selected from the group consisting of —SO$_3$H or a salt thereof, —(C$_1$-C$_6$)alkyl, —O(C$_1$-C$_6$)alkyl, —OC(O)(C$_1$-C$_6$)alkyl, —(C$_2$-C$_6$)alkenyl, and —(C$_6$-C$_{10}$)aryl, where at least one carbon atom from the —(C$_1$-C$_6$)alkyl, —O(C$_1$-C$_6$)alkyl, —OC(O)(C$_1$-C$_6$)alkyl, —(C$_2$-C$_6$)alkenyl, and —(C$_6$-C$_{10}$)aryl groups is substituted by at least one —SO$_3$H group or a salt from this group.

In a preferred embodiment, the polyacid II comprises monomer units formed from at least one ethylenically unsaturated monomer comprising at least one sulfonic acid group or a salt thereof, selected from the group consisting of vinylsulfonic acid, 2-hydroxy-3-(prop-2-enoyloxy)propane-1-sulfonic acid, 2-hydroxy-3-[(meth)acryloyloxy]propane-1-sulfonic acid, 3-allyloxy-2-hydroxypropane-1-sulfonic acid, styrene-3-sulfonic acid, 3-(meth)allyloxybenzene-1-sulfonic acid, α-methylstyrenesulfonic acid, α-ethylstyrenesulfonic acid, allyloxybenzenesulfonic acid, (meth)allyloxybenzenesulfonic acid, bis(3-sulfopropyl) maleate, bis(2-sulfoethyl) maleate, bis(3-sulfopropyl) itaconate, bis(2-sulfoethyl) itaconate, 2-propene-1-sulfonic acid, 2-methyl-2-propene-1-sulfonic acid, 4-vinylphenylsulfonic acid and salts of the aforementioned acids and mixtures of the aforementioned monomers, and at least one further ethylenically unsaturated monomer selected from the group consisting of acrylic acid, methacrylic acid, maleic acid, itaconic acid and salts of the aforementioned acids and mixtures of the aforementioned monomers.

In a further preferred embodiment, the polyacid II comprises monomer units formed from the ethylenically unsaturated monomers acrylic acid, methacrylic acid and 2-methyl-2-propene-1-sulfonic acid or the corresponding salts.

In a particularly preferred embodiment, the polyacid II comprises monomer units formed from the ethylenically unsaturated monomers acrylic acid, methacrylic acid and 2-methyl-2-propene-1-sulfonic acid or the corresponding salts, where the proportion by weight of the monomers of acrylic acid is 10% to 40% by weight, that of methacrylic acid is 10% to 40% by weight and that of 2-methyl-2-propene-1-sulfonic acid is 10% to 40% by weight, based on the total weight of the monomers from which the polymer II is formed.

In a further particularly preferred embodiment, the polyacid II comprises monomer units formed from the ethylenically unsaturated monomers acrylic acid and 2-methyl-2-propene-1-sulfonic acid or the corresponding salts, where the proportion by weight of the monomers of acrylic acid is 20% to 80% by weight and that of 2-methyl-2-propene-1-sulfonic acid is 20% to 80% by weight, based on the total weight of the monomers from which the polymer II is formed.

In a further particularly preferred embodiment, the polyacid II comprises monomer units formed from the ethylenically unsaturated monomers methacrylic acid and 2-methyl-2-propene-1-sulfonic acid or the corresponding salts, where the proportion by weight of the monomers of methacrylic acid is 20% to 80% by weight and that of 2-methyl-2-propene-1-sulfonic acid is 20% to 80% by weight, based on the total weight of the monomers from which the polymer II is formed.

In a particularly preferred embodiment, the polyacid II comprises monomer units formed from at least one allylic monomer comprising at least one sulfonic acid group or a salt from this group.

In this connection, an allylic monomer comprising at least one sulfonic acid group refers to a monomer comprising a 2-propenyl group and at least one sulfonic acid group or a salt from this group. 2-Propenyl group is understood here to mean a monounsaturated $C_3$ group that may be bonded to the monomer via an oxygen atom or is joined directly to the sulfonic acid group.

Preferably, the 2-propenyl group is joined directly to the sulfonic acid group. Optionally, the 2-propenyl group may bear further substituents, preferably a methyl substituent, or be unsubstituted. Owing to autoinhibition by the allylic monomer units during the free-radical polymerization, there may be elimination of partial chains at relatively low molar masses of the allylic monomer units and hence of the resulting polymers (see "George Odian, Principles of Polymerization, 4th Edition, Wiley-Interscience, 2004"). This effect is surprisingly advantageous for the present invention.

In a further particularly preferred embodiment, the polyacid II comprises monomer units formed from at least one allylic monomer comprising at least one sulfonic acid group or a salt thereof, selected from the group consisting of 3-allyloxy-2-hydroxypropane-1-sulfonic acid, 3-(meth)allyloxybenzene-1-sulfonic acid, allyloxybenzenesulfonic acid, (meth)allyloxybenzenesulfonic acid, 2-propene-1-sulfonic acid, 2-methyl-2-propene-1-sulfonic acid and salts of the aforementioned acids and mixtures of the aforementioned monomers, and optionally at least one further ethylenically unsaturated monomer selected from the group consisting of acrylic acid, methacrylic acid, maleic acid, itaconic acid and salts of the aforementioned acids and mixtures of the aforementioned monomers.

The polymer I and the polyacid II may independently be in the form of a monopolymer (homopolymer) or of a copolymer. The copolymers include random copolymers, gradient copolymers, alternating copolymers, block copolymers and graft copolymers. It is preferable that the copolymers take the form of linear random copolymers or of linear block copolymers.

It is preferable that the polymer I has an average (weight-average) molecular weight of less than 2 500 000 g/mol or less than 1 500 000 g/mol, more preferably of 50 000 to 1 500 000 g/mol. The average molecular weight may be determined as the weight-average by gel permeation chromatography, for example in THF. For this purpose, the liquid polymer dispersion is dissolved in a large excess of tetrahydrofuran (THF), for example with a polymer concentration of 2 milligrams of polymer per milliliter of THF, and the insoluble component is removed with a membrane filter of mesh size 200 nm.

It is preferable that the polyacid II has an average (weight-average) molecular weight of less than 250 000 g/mol or less than 150 000 g/mol, more preferably of 1000 to 50 000 g/mol. The average molecular weight may, as described in the examples, be determined as the weight-average by gel permeation chromatography.

The polymerization can be effected by bulk polymerization, solution polymerization, emulsion polymerization, suspension polymerization or precipitation polymerization. It is possible to use a suitable free-radical, anionic and/or cationic initiator. Suitable initiators are known to those skilled in the art. For the polymer I, preference is given to emulsion polymerization using a free-radical initiator, as set out above. For the polyacid II, preference is given to solution polymerization using a free-radical initiator, as set out above.

It is a feature of the process of the invention that the, in process step (1), by mixing (i) at least one aqueous dispersion comprising particles comprising at least one polymer I and (ii) a polyacid II, a dispersion is obtained, wherein the dispersion has a pH of <4. Particular preference is given to a pH of <3, especially a pH in the range from 1 to 3.

The pH can be measured by a pH meter (Ahlbom ALMEMO 2590-9; combination pH electrode: Schott 6381), preferably according to DIN ISO 976 (December 2016). As set out above, at this low pH, the formation of a protective shell of the polyacid II around the polymer particles is possible. The polyacid II does not only act thereby as a spraying aid, but the protective shell formed is likely also to have a positive effect on the redispersibility of the polymer particles obtainable by the process of the invention.

The pH is greatly influenced by the pH of the polyacid II and can be influenced by the degree of neutralization of the polyacid. If the polyacid II is used as a solution, it is possible by adjusting the pH of the solution comprising the polyacid II, for example by adding an acid or base to the solution, to predetermine the pH of the dispersion resulting from step (1).

The polyacid II may be used in the process of the invention as an aqueous solution or in solid form. Preference is given to using an aqueous solution in which the pH is already <4, preferably <3, especially preferably in the range from 1 to 3. By mixing the two components (i) and (ii), what is then obtained in process step (1) is an aqueous dispersion having a pH of <4, preferably <3, especially preferably in the range from 1 to 3.

The concentrations of the aqueous dispersion comprising the particles and the amount of the polyacid II or optionally the concentration of the aqueous solution comprising the polyacid II are preferably selected so as to satisfy the quantitative ratios of polyacid II reported hereinafter, based on the weight of the particles, or of the combination of particles and polyacid II, based on the total weight of the dispersion.

The dispersion resulting from step (1) comprises the combination of
particles comprising at least one polymer I, and
polyacid II
preferably in an amount of 10-70% by weight based on the total weight of the dispersion.

In a preferred embodiment, the dispersion resulting from step (1) comprises the combination of
particles comprising at least one polymer I, and
polyacid II
in an amount of 30-70% by weight, more preferably in an amount of 30-60% by weight, especially preferably in an amount of 40-55% by weight, based on the total weight of the dispersion.

The percentages by weight with regard to the combination of
particles comprising at least one polymer I, and
polyacid II
each relate to the amount of solids (without water) based on the total weight of the dispersion.

The amount of the polyacid II relative to the particles (each in solid form) may vary over a wide range.

Preferably, the polyacid II is used in an amount of 2% to 50% by weight, more preferably 5% to 40% by weight, even more preferably 5% to 15% by weight, based on the weight of the particles comprising at least one polymer I.

In process step (2) of the process of the invention, the dispersion resulting from step (1) having the above-specified pH is dried in order to obtain the redispersible dispersion powder.

The drying can be effected by roll drying, spray drying, drying by a fluidized bed method, by bulk drying at elevated temperature, or other standard drying methods. The preferred drying temperature range is between 50° C. and 230° C. Alternatively, freeze-drying may also be effected.

In a preferred embodiment, the process of the invention comprises, as step (2), the spray-drying of the dispersion resulting from step (1) in order to obtain the redispersible dispersion powder.

Preference is given here to an inlet temperature of the drying air in the range from 100° C. to 250° C., preferably 130° C. to 220° C., and an outlet temperature in the range from 30° C. to 120° C., preferably 50° C. to 100° C. Especially preferred is an inlet temperature in the range from 130 to 150° C. and an outlet temperature of 60 to 85° C.

The suspensions can be dried using a GEA Niro Mobile Minor type MM-I spray drier. Drying is effected with the aid of a two-phase nozzle in the top of the tower. The drying is preferably dried with nitrogen which is blown in from the top downward in cocurrent with the drying material.

Drying is preferably effected with drying gas at 60 to 100 kg/h, more preferably 80 kg/h. The powder discharged from the drying tower with the drying gas can be separated from the drying gas with the aid of a cyclone.

In a preferred embodiment, the process of the invention further comprises the step of
(3) mixing the redispersible dispersion powder from step (2) with
(iii) an antiblocking agent.

Antiblocking agents reduce the agglomeration of the polymer particles in the redispersible dispersion powder. Nonlimiting examples of antiblocking agents are bentonite, quartz sand, quartz flour, kieselguhr, silica, colloidal silica gel, microsilica, fumed silica, or precipitated silica that may optionally have been hydrophobized, clay, magnesium hydrosilicates, talc (magnesium silicate hydrate), calcium hydrosilicates, kaolin (aluminum silicate hydrate), mica, xonolite, calcium sulfate, magnesium sulfate, barium sulfate, titanium dioxide, calcium carbonate, magnesium carbonate, Ca/Mg carbonate and mixtures of the aforementioned agents. Preferred antiblocking agents are silica, talc, calcium carbonate, kaolin and mixtures thereof. The proportion of the antiblocking agent is preferably between 4% and 20% by weight, based on the total weight of all constituents of the redispersible polymer powder. In a particularly preferred embodiment, the antiblocking agent is talc, calcium carbonate and/or silica in a proportion of between 4% and 20% by weight, based on the total weight of all constituents of the redispersible polymer powder.

It is additionally/alternatively possible also to add one of the above-described antiblocking agents during the drying. This need not necessarily be the same antiblocking agent that is added after the drying. Preference is given to adding silica that may optionally have been hydrophobized. If the antiblocking agent is added during the drying, the proportion is preferably between 0.1-4.0% by weight, more preferably between 0.5-2.0% by weight, based on the total weight of all constituents of the redispersible polymer powder.

As already described above, further advantages of the process of the invention arise from the use of an additive that acts as emulsifier. It is suspected that the emulsifier improves the formation of the protective shell of the polyacid II around the polymer particles. Preference is therefore given in the process of the invention to using an additive that acts as emulsifier. The additive is more preferably used in step (1) of the process. Particularly advantageous additives have been found to be those comprising a polyoxyalkylene group.

In a further preferred embodiment of the process of the invention, therefore, an additive comprising a polyoxyalkylene group, preferably a polyoxyethylene group where the degree of ethoxylation is 6 to 50, is mixed in in step (1), wherein the additive
(a) is mixed into the mixture from step (1) as a further component, or
(b) is applied in a preceding step by emulsion polymerization on the surface of the particles, or
(c) is incorporated in a preceding step as a monomer unit into the polymer I of the particles.

It is also possible in accordance with the invention that options (a), (b) and (c) are employed in combination.

Option (a) should be understood to mean that the additive is mixed in as a further component of the in step (1), wherein the additive may be added as an aqueous solution or in solid form.

Option (b) should be understood to mean that the additive is already present in the emulsion polymerization when the polymer particles comprising the polymer I are produced. In this way, the additive is applied on the surface of the polymer particles, but without forming any covalent bonds, and instead forming hydrogen bonds between the polymer chain and the additive.

Option (c) should be understood to mean that the additive is introduced via the side chain of a monomer present in the preparation of the polymer I, such that the polymer chain obtained comprises not only the monomer units characteristic of the polymer I that have been described in detail above but also further monomer units that arise from an ethylenically unsaturated monomer comprising a polyoxyalkylene group in the side chain. Such monomers are also referred to in accordance with the invention as polyoxyalkylenated ethylenically unsaturated monomers.

The polyoxyalkylene group may be a polyoxy($C_1$-$C_4$) alkylene group, preferably a polyoxyethylene group. The polyoxyalkylene group of the additive is preferably a polyoxyethylene group where the degree of ethoxylation is 6 to 50. It is particularly preferable that the degree of ethoxylation is 10 to 35.

The degree of ethoxylation refers to the average number of ethoxy groups (—$CH_2$—$CH_2$—O—) per molecule of additive or per monomer unit in the case of option (c).

In a particularly preferred embodiment A of the process of the invention, an additive comprising a polyoxyethylene group where the degree of ethoxylation is 6 to 50 is mixed in in step (1), wherein the additive
(a) is mixed into the mixture from step (1) as a further component, and/or
(b) is applied in a preceding step by emulsion polymerization on the surface of the particles.

In a particularly preferred embodiment A of the process of the invention, an additive comprising a polyoxyethylene group where the degree of ethoxylation is 6 to 50 is mixed in in step (1), wherein the additive
(a) is mixed into the mixture from step (1) as a further component.

In another particularly preferred embodiment B of the process of the invention, an additive comprising a polyoxyethylene group where the degree of ethoxylation is 6 to 50 is mixed in in step (1), wherein the additive
(b) is applied in a preceding step by emulsion polymerization on the surface of the particles.

In another particularly preferred embodiment C of the process of the invention, an additive comprising a polyoxyethylene group where the degree of ethoxylation is 6 to 50 is mixed in in step (1), wherein the additive
(c) is incorporated in a preceding step as a monomer unit into the polymer I of the particles.

With regard to embodiments A, B and C, it is particularly preferable that the degree of ethoxylation of the polyoxyethylene group of the additive is 10 to 35.

The additives that are used according to option (a) or (b) are preferably polyoxyalkenylated ($C_6$-$C_{22}$) alcohols, ($C_6$-$C_{30}$) carboxylic acids, ($C_6$-$C_{30}$)alkylamines, sorbitan esters, triglycerides or alkylphenols, where the polyoxyalkylene group is preferably one of the abovementioned polyoxyalkylene groups, especially a polyoxyethylene group.

The expression "($C_6$-$C_{22}$) alcohol" denotes a linear aliphatic carbon chain comprising 6 to 22 carbon atoms or a branched aliphatic carbon chain comprising 4 to 22 carbon atoms, where the carbon chain is substituted by at least one hydroxyl group. Nonlimiting illustrative compounds include cis-9-hexadecen-1-ol, trans-9-octadecen-1-ol, cis-9-octadecen-1-ol, 1-decanol, 1-hexadecanol, 1-heptadecanol, 1-octadecanol, isotridecanol, 2-propyl-4-methylhexanol, 2-propyl-5-methylhexanol, 2-isopropyl-4-methylhexanol, 2-isopropyl-5-methylhexanol, 2-propyl-4,4-dimethylhexanol, 2-ethyl-2-methylheptanol and 2-ethyl-2,5-dimethylhexanol.

Nonlimiting illustrative compounds of the ($C_6$-$C_{30}$) carboxylic acids are capric acid, undecanoic acid, lauric acid, tridecanoic acid, myristic acid, pentadecanoic acid, palmitic acid, stearic acid and cerotic acid.

Sorbitan esters are cyclic sorbitol esters of ($C_6$-$C_3$) carboxylic acids.

The term "triglyceride" denotes the triesters of glycerol with ($C_6$-$C_{30}$) carboxylic acids, where the ($C_6$-$C_{30}$) carboxylic acids may also be exchanged by transesterification with a polyalkylene oxide. The triglycerides may be of vegetable or animal origin. Nonlimiting illustrative compounds are pork fat, butter oil, linseed oil, olive oil, palm oil, soya oil and coconut oil.

The term "alkylphenol" relates to a phenyl substituted by alkyl in the ortho, meta or para positions. The term "alkyl" in connection with alkylphenols denotes a linear or branched aliphatic saturated or unsaturated carbon group comprising 1 to 36 carbon atoms if no other basis is given. Nonlimiting illustrative ($C_1$-$C_{36}$)alkyl groups in connection with alkylphenols include n-heptyl, n-octyl, 2-ethylhexyl, isooctyl, nonyl, isononyl, decyl, isodecyl, cis-6-hexadenecene, 2-hexylethyl, and 2-propylheptyl.

In a further preferred embodiment, the additive comprising a polyoxyalkylene group in the case of options (a) and (b) is selected from the group consisting of ($C_6$-$C_{22}$) alcohol ethoxylates, ($C_6$-$C_{22}$) alcohol ether sulfonates and ($C_6$-$C_{22}$) alcohol ether sulfates, and in the case of option (c) is incorporated into the polymer as polyoxyethylenated ethylenically unsaturated monomer.

The term ($C_4$-$C_{22}$) alcohol ether sulfates, also called ($C_6$-$C_{22}$) alcohol polyglycol ether sulfates (or ($C_6$-$C_{22}$) alcohol ether sulfonates), is understood to mean the sulfates (or sulfonates) of the addition products of polyethylene glycol onto a ($C_6$-$C_{22}$) alcohol.

It is particularly preferable that the additive comprising a polyoxyalkylene group in the case of options (a) and (b) is a ($C_6$-$C_{22}$) alcohol ethoxylate and/or a ($C_6$-$C_{22}$) alcohol ether sulfonate or sulfate. In one embodiment, the additive comprising a polyoxyalkylene group in the case of options (a) and (b) is a $C_{12}$ alcohol ether sulfonate or sulfate (dodecyl ether sulfate).

The additives that are used according to option (a) or (b) are preferably used in an amount of 0.2-10% by weight, more preferably in an amount of 0.2-5% by weight, especially preferably in an amount of 0.5-5% by weight, based on the total weight of the dispersion. In the case of option (c), suitable monomers are preferably incorporated into the polymer I of the particles an amount of 0.2-10% by weight, more preferably in an amount of 0.2-5% by weight, especially preferably in an amount of 0.5-5% by weight, based on the total weight of the dispersion.

The polymer dispersion is typically prepared in the presence of at least one surface-active compound. An extensive description of suitable protective colloids may be found in Houben-Weyl, Methoden der organischen Chemie, volume XIV/1, Makromolekulare Stoffe, Georg Thieme Verlag, Stuttgart, 1961, pp. 411 to 420. Suitable emulsifiers may also be found in Houben-Weyl, Methoden der organischen Chemie, volume 14/1, Makromolekulare Stoffe, Georg Thieme Verlag, Stuttgart, 1961, pp. 192 to 208.

Suitable emulsifiers are not only anionic and cationic emulsifiers but also nonionic emulsifiers. It is preferred when the surface-active substances employed are emulsifiers typically having relative molecular weights less than those of protective colloids. It has proven particularly advantageous to employ exclusively anionic emulsifiers or a combination of at least one anionic emulsifier and at least one nonionic emulsifier.

Usable nonionic emulsifiers are araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are EO/PO block copolymers. Preference is given to using ethoxylates of long-chain alkanols (alkyl radical $C_1$-$C_{30}$, average degree of ethoxylation 5 to 100) and, among these, particular preference to those having a linear $C_{12}$-$C_{20}$ alkyl radical and an average degree of ethoxylation of 10 to 50, and also to ethoxylated monoalkylphenols.

Suitable anionic emulsifiers are, for example, alkali metal and ammonium salts of alkyl sulfates (alkyl radical: $C_8$-$C_{22}$), of sulfuric monoesters of ethoxylated alkanols (EO level: 2 to 50, alkyl radical: $C_{12}$-$C_{18}$) and ethoxylated alkylphenols (EO level: 3 to 50, alkyl radical: $C_4$-$C_9$), of alkylsulfonic acids (alkyl radical: $C_{12}$-$C_{18}$) and of alkylarylsulfonic acids (alkyl radical: $C_4$-$C_6$). Further suitable emulsifiers may be found in Houben-Weyl, Methoden der organischen Chemie, volume XIV/1, Makromolekulare Stoffe, Georg-Thieme-Verlag, Stuttgart, 1961, pp. 192-208. Likewise suitable as anionic emulsifiers are bis(phenylsulfonic acid) ethers and the alkali metal or ammonium salts thereof which bear a $C_4$-$C_{24}$ alkyl group on one or both aromatic rings. These compounds are generally known, for example from U.S. Pat. No. 4,269,749 A, and commercially available, for example as Dowfax® 2A1 (Dow Chemical Company).

Suitable cationic emulsifiers are preferably quaternary ammonium halides, for example trimethylcetylammonium chloride, methyltrioctylammonium chloride, benzyltriethylammonium chloride or quaternary compounds of N—$C_6$-$C_{20}$-alkylpyridines, -morpholines or -imidazoles, for example N-laurylpyridinium chloride.

As already mentioned above, the present invention relates to a redispersible dispersion powder obtainable by the process of the invention. The redispersible dispersion powder can be redispersed particularly efficiently, which is attributable to the structural properties that arise from the production process of the invention. More particularly, the polymer particles are affected in terms of redispersibility by the polyacid II, which is explicable in that the polyacid II forms a protective shell around the polymer particles via hydrogen bonds that form particularly efficiently at the acidic pH of the dispersion used in the process.

Preferably, the redispersible dispersion powder also comprises an antiblocking agent. Suitable antiblocking agents are those mentioned above.

The redispersible dispersion powder may, as well as the antiblocking agent, comprise further additives, for example flame retardants, antioxidants, light stabilizers, biocides, fibrous and pulverulent fillers or reinforcers or antistats, defoamers, thickeners, and other additives, or mixtures thereof. These may either be added after the drying or they may already have been added prior to the drying, i.e. in step (1). Only for the antiblocking agent is preferable that it is not added until after the drying.

A particularly preferred additive is a defoamer, which is again preferably added in step (1).

The invention further relates to an aqueous dispersion obtainable by step (1) of the process. The acidic pH of the dispersion is advantageous for the spray drying and redispersibility of the redispersible dispersion powders thus producible.

The invention therefore also further relates to the use of the aqueous dispersion of the invention for production of a redispersible dispersion powder.

The invention further relates to a building material composition comprising
the redispersible dispersion powder of the invention, or
the aqueous dispersion of the invention.

The building material composition has improved properties in terms of processability, flexibility, adhesion, deformability, abrasion resistance, watertightness, density, flexural and cohesive strength and/or long-term stability. The building material composition can be used as a coating of surfaces in order, for example, to correct unevenness or to make the surface more resistant to corrosion through environmental effects, for example by $CO_2$, $SO_2$, $Cl_2$ or salts. It is additionally possible to improve crack-bridging properties.

The invention also further relates to the use of the redispersible dispersion powder of the invention in a building material composition. It is particularly advantageous that the building material composition can be used in the form of dry mixes because the redispersible dispersion powder of the invention has particularly good redispersibility.

More particularly, the use of the redispersible dispersion powder of the invention is advantageous for the following building material compositions, or preference is given to the following building material compositions of the inventions:
tile adhesives,
tile join mortars,
mortars for thermal insulation systems,
stucco, smoothing render and skim renders,
patching and repair mortars,
self-leveling lower and upper coats,
watertight sealing compounds (membranes),
joint filler, and
powder coating.

These building material compositions are also called raw material-modified building material compositions. The building material composition may comprise a mineral binder.

Mineral binders such as lime, gypsum, cement or mixtures thereof are known from the prior art. They are used, for example, for the production of mortars and concretes. The cement used may in particular be cements according to DIN EN 197-1 (November 2011) or comparable standards; for example, the cement used may be white cement or gray cement, such as portland cement. The term "cement" also includes calcium aluminate cements, calcium sulfoaluminate cements (CSA cements) and mixtures thereof.

Calcium aluminate cements include minerals of the formula $CaO \times Al_2O_3$. They can be obtained, for example, by melting calcium oxide (CaO) or limestone ($CaCO_3$) with bauxite or aluminate. Calcium aluminate cements comprise, for instance, 20% to 40% by weight of CaO, up to 5% by weight of $SiO_2$, about 40% to 80% by weight of $Al_2O_3$ and up to about 20% by weight of $Fe_2O_3$. Calcium aluminate cements are defined in standard DIN EN 14647 (January 2006).

Calcium sulfoaluminate cements can be produced from tricalcium aluminate (3 $CaO \times Al_2O_3$), anhydrite ($CaSO_4$), calcium sulfate hemihydrate ($CaSO_4 \times 0.5H_2O$) and/or gypsum ($CaSO_4 \times 2\ H_2O$).

Mineral binders also include latently hydraulic binders such as microsilica, metakaolin, aluminosilicates, fly ashes, activated clay, pozzolans and mixtures thereof. A latently hydraulic binder only becomes hydraulic in the presence of a basic activator. The alkaline medium for activation of the binders typically consists of aqueous solutions of alkali metal carbonates, alkali metal fluorides, alkali metal hydroxides, alkali metal aluminates and/or alkali metal silicates, for example soluble waterglass.

In addition, according to the application, it is possible to add customary additives such as plasticizers, thickeners or other rheology aids, fillers, air pore formers, defoamers, accelerators, retardants, wetting aids, etc.

The invention is described in detail by the examples that follow.

EXAMPLES

Determination of the Molecular Weight of the Polyacid II:

The sample was prepared for the determination of molar mass by dissolving copolymer solution in the GPC eluent, such that the polymer concentration in the GPC eluent is 0.5% by weight.

Thereafter, this solution was filtered through a syringe filter having a polyethersulfone membrane and pore size 0.45 μm. The injection volume of this filtrate was 50-100 μl.

The average molecular weights were determined on a Waters GPC instrument with the model name Alliance 2690 with a UV detector (Waters 2487) and RI detector (Waters 2410). The following settings and conditions were used:

Columns: Shodex SB-G Guard Column for SB-800 HQ series and Shodex OHpak SB 804HQ and 802.5HQ (PHM gel, 8×300 mm, pH 4.0 to 7.5)

Eluent 0.05 M aqueous ammonium formate/methanol mixture=80:20 (parts by volume)

Flow rate: 0.5 ml/min

Temp.: 50° C.

Injection: 50 to 100 μl

Detection: RI and UV

The molecular weights of the copolymers were determined relative to polyacrylic acid standards from PSS Polymer Standards Service GmbH. The molecular weight distribution curves of the polyacrylic acid standards were determined by means of light scattering.

Provision of Polymer Dispersions and Spraying Aids:

Dispersion 1:

The dispersion comprises a styrene-2-ethylhexyl acrylate copolymer still comprising monomer units that result from the stabilizing auxiliary monomers hydroxyethyl methacrylate (HEMA) and 2,3-epoxypropyl methacrylate (GMA). The dispersion has a solids content of 55% by weight. The polymer has a glass transition temperature of −15° C. and a particle size of about 600 nm. The dispersion additionally comprises 0.5% by weight of ($C_{18}$-$C_{18}$)alkyl ethoxylate having a degree of ethoxylation of 18, 0.3% by weight of a mixture of sodium diethylhexylsulfosuccinate/isotridecanol ethoxylate having a degree of ethoxylation of 4 and 0.1% by weight of $C_{12-14}$-alkyl$(EO)_{30}SO_4$Na.

Dispersion 2:

The dispersion comprises a styrene-2-ethylhexyl acrylate copolymer still comprising monomer units that result from the stabilizing auxiliary monomers monomer methoxypoly (oxyethylene) methacrylate having a degree of ethoxylation of 17 and of 2,3-epoxypropyl methacrylate (GMA).

The dispersion has a solids content of 56.5% by weight. The polymer has a glass transition temperature of −13° C. and a particle size of about 510 nm. The dispersion additionally comprises 0.5% by weight of polyoxyethylenated $C_{12}$-$C_{14}$ alcohol ethoxylates having a degree of ethoxylation of 4, sulfated, and 0.3% by weight of sodium laurylsulfate.

Dispersion 3:

The dispersion comprises a styrene-butadiene copolymer still comprising monomer units that result from the stabilizing auxiliary monomers hydroxyethyl methacrylate (HEMA) and acrylic acid. The dispersion has a solids content of 51% by weight. The polymer has a glass transition temperature of 0° C. and a particle size of about 160 nm. The dispersion additionally comprises 1% by weight of $C_{12-14}$-alkyl$(EO)_4SO_4$Na, 0.7% by weight of isotridecanol ethoxylates having a degree of ethoxylation of 4 and 0.5% by weight of isotridecanol ethoxylates having a degree of ethoxylation of 8.

Dispersion 4:

The dispersion comprises, as well as the styrene-butadiene copolymer from dispersion 3, also 3% by weight (based on the solids content of the dispersion) of isotridecanol ethoxylate having a degree of ethoxylation of 25.

Spraying Aids (SA)

Spraying Aid 1:

In a reaction vessel equipped with reflux condenser, stirrer, thermometer, dropping funnel and nitrogen sparging, an initial charge of 180 g of water, 94.8 g of Na-methylpropenesulfonic acid and 3 g of 2,2'-azobis(2-methylpropionamidine) dihydrochloride (Wako V50) was heated to 80° C. On attainment of the temperature, while stirring at 80-90° C., a solution of 3 g of 2,2'-azobis(2-methylpropionamidine) dihydrochloride, 108 g of acrylic acid, 129 g of methacrylic acid and 150 g of water was metered in over a period of 36 min. The reaction solution was stirred at 80° C. for 1 h and then cooled down to room temperature. The resulting product was a clear polymer solution having a solids content of 52.0% by weight, a pH of 1.4 and a molecular weight $M_w$ of about 2400 g/mol.

Spraying Aid 1A:

Spraying aid 1A was adjusted to a pH of 2.4 with NaOH.

Spraying Aid 1B:

Spraying aid 1A was adjusted to a pH of 3.4 with NaOH.

Comparative Spraying Aid 1C:

Spraying aid 1A was adjusted to a pH of 4.2 with NaOH.

Comparative Spraying Aid 1D:

Spraying aid 1A was adjusted to a pH of 6.1 with NaOH.

Spraying Aid 1E:

Spraying aid 1A was adjusted to a pH of 1.9 with $H_2SO_4$.

Comparative Spraying Aid 2:

In a reaction vessel equipped with reflux condenser, stirrer, thermometer, dropping funnel and nitrogen sparging, an initial charge of 140 g of water and 2 g of 2,2'-azobis(2-methylpropionamidine) dihydrochloride (Wako V50) was heated to 70° C. On attainment of the temperature, while stirring at 70-90° C., a solution of 2 g of 2,2'-azobis(2-methylpropionamidine) dihydrochloride, 3 g of 3-mercaptopropionic acid, 100 g of acrylic acid and 100 g of water was metered in over a period of 36 min. The reaction solution was stirred at 80° C. for 1 h and then cooled down to room temperature. The resulting product was a clear polymer solution having a solids content of 46.3% by weight, a pH of 1.4 and a molecular weight $M_w$ of about 11 600 g/mol.

Comparative Spraying Aid 2A:

An aliquot of spraying aid 2 was adjusted to a pH of 6.0 with NaOH.

Comparative Spraying Aid 2B:

An aliquot of spraying aid 2A was adjusted to a pH of 1.4 with $H_2SO_4$.

Comparative Spraying Aid 3:

A polyacrylic acid having a pH of ~2 and a molecular weight $M_w$ of about 5000 g/mol, which is manufactured by BASF and is available under the Sokalan PA 25 XS trade name.

Comparative Spraying Aid 4:

A polyacrylic acid having a pH of ~8 and a molecular weight $M_w$ of about 8000 g/mol, which is manufactured by BASF and is available under the Sokalan PA 30 trade name.

Spraying Aid 5:

In a reaction vessel equipped with reflux condenser, stirrer, thermometer, dropping funnel and nitrogen sparging, an initial charge of 200 g of water, 81 g of Na-methylpropenesulfonic acid and 1.5 g of 2,2'-azobis(2-methylpropionamidine) dihydrochloride (Wako V50) was heated to 73° C. On attainment of the temperature, while stirring at 73-81° C., a solution of 1.5 g of 2,2'-azobis(2-methylpropionamidine) dihydrochloride, 250 g of methacrylic acid and 130 g of water was metered in over a period of 1 h. The reaction solution was stirred at 80° C. for 1 h and then cooled down to room temperature. The resulting product was a clear polymer solution having a solids content of 50.3% by weight, a pH of 1.4 and a molecular weight $M_w$ of about 1400 g/mol.

Spraying Aid 6:

In a reaction vessel equipped with reflux condenser, stirrer, thermometer, dropping funnel and nitrogen sparging, an initial charge of 280 g of water and 195 g of Na-2-acrylamido-2-methylpropanesulfonic acid (AMPS) was heated to 18° C. While stirring, 70 g of a 50% sodium hydroxide solution were added dropwise at 18° C. Subsequently, 68 g of acrylic acid, 2.8 g of 2,2'-azobis(2-methylpropionamidine) dihydrochloride (Wako V50) and 4 g of mercaptoethanol were metered in while stirring over a period of 10 min. The reaction solution was stirred at 70 to 80° C. for 1.5 h and then cooled down to room temperature. The resulting product was a clear polymer solution having a solids content of 48.1% by weight, a pH of 0.8 and a molecular weight M, of about 8400 g/mol.

Spraying Aid 7:

In a reaction vessel equipped with reflux condenser, stirrer, thermometer, dropping funnel and nitrogen sparging, an initial charge of 350 g of water and 313 g of Na-2-acrylamido-2-methylpropanesulfonic acid (AMPS) was heated to 18° C. While stirring, 112 g of a 50% sodium hydroxide solution were added dropwise at 18° C. Subsequently, 27 g of acrylic acid, 2.8 g of 2,2'-azobis(2-methylpropionamidine) dihydrochloride (Wako V50) and 6 g of mercaptoethanol were metered in while stirring over a period of 14 min. The reaction solution was stirred at 70 to 80° C. for 1.5 h and then cooled down to room temperature. The resulting product was a clear polymer solution having a solids content of 48.5% by weight, a pH of 0.8 and a molecular weight M, of about 7400 g/mol.

Production of a Polymer Powder by Spray Drying:

The spray drying was conducted with a laboratory drier (Niro Atomizer) from Niro with nitrogen as drying gas. The aqueous dispersion comprising the water-soluble spraying aid that was to be dried in each case was sprayed through a two-phase nozzle with a solids content of 40-60%. The inlet temperature of the drier gas was 130 to 140° C.; its outlet temperature was 60 to 70° C. The antiblocking agent used was 0.5% to 1% by weight (based on the solids content of the feed solution) of silica and 9% by weight (based on the solids content of the feed solution) of Luzenac talc (from Imerys).

Determination of the Redispersibility of the Dispersion Powder:

The composition composed of a dispersion with spraying aid (SA) specified in table 1 was used to produce films and their redispersion was tested. For this purpose, the liquid dispersion (5 g of solids) in 10-15 mL of water was admixed with the described amount of the respective spraying aid and dried at 60° C. overnight. Of the resulting film, about 0.5 g was taken up in 10 mL of distilled water while stirring (200 rpm) at room temperature. On rapid redispersion within a few minutes, it was found that these dispersion systems also have excellent spray-driability and a redispersible powder (RDP) is obtained.

Redispersion was assessed as follows:

Complete redispersion within a few minutes: very good

Virtually complete redispersion within a few minutes: good

Incomplete redispersion (parts of the film still apparent): moderate

Large parts of the film insoluble or no redispersion: poor

TABLE 1

Redispersibility of the redispersible dispersion powders

| No. | Dispersion | SA | Amount of SA to solids content of dispersion | pH of SA | Redispersibility of the film | Redispersibility of the powder |
|---|---|---|---|---|---|---|
| i) | 1 | 1 | 10% by weight | 1.4 | very good | very good |
| ii) | 1 | 1 | 7% by weight | 1.4 | very good | very good |
| iii) | 1 | 1A | 10% by weight | 2.4 | very good | n.d. |
| iv) | 1 | 1B | 10% by weight | 3.4 | moderate | n.d. |
| v) (ref. ex.) | 1 | Ref.-1C | 10% by weight | 4.2 | poor | n.d. |
| vi) (ref. ex.) | 1 | Ref.-1D | 10% by weight | 6.1 | poor | poor |
| vii) | 1 | 1E | 10% by weight | 1.9 | very good | n.d. |
| viii) (ref. ex.) | 1 | Ref.-2 | 10% by weight | 1.4 | very good | very good |
| ix) (ref. ex.) | 1 | Ref.-2A | 10% by weight | 6.0 | poor | n.d. |
| x) (ref. ex.) | 1 | Ref.-2B | 10% by weight | 1.4 | good | n.d. |
| xi) (ref. ex.) | 1 | Ref.-3 | 10% by weight | ~2 | very good | very good |
| xii) (ref. ex.) | 1 | Ref.-4 | 10% by weight | ~8 | poor | n.d. |
| xiii) | 1 | 5 | 7% by weight | 1.4 | very good | very good |
| xiv) | 1 | 5 | 10% by weight | 1.4 | very good | very good |
| xv) | 2 | 1 | 10% by weight | 1.4 | very good | very good |
| xvi) | 3 | 1 | 10% by weight | 1.4 | very good | n.d. |
| xvii) | 4 | 1 | 10% by weight | 1.4 | very good | very good |
| xviii) | 1 | 6 | 10% by weight | 0.8 | poor | n.d. |
| xix) | 1 | 7 | 10% by weight | 0.8 | poor | n.d. |

(n.d. = not determined)

It is found that it is advantageous for redispersibility when the pH of the dispersion is <4 and when the spraying aid is a polyacid formed from at least one ethylenically unsaturated monomer comprising a sulfonic acid group. Particular preference is given to the use of a spraying aid based on at least one allylic monomer comprising at least one sulfonic acid group.

Production of a Building Material Composition with a Redispersible Dispersion Powder The redispersible dispersion powder of the present invention was used to produce building material compositions according to table 2. Example 1 here is a comparative example in which, rather than the redispersible dispersion powder, a styrene-acrylate copolymer (Acronal) was used.

The dispersion-modified mineral building material mixture was used to produce a thin film (height: 2.0 mm, width 12.0 cm and length 20 to 25 cm). The appearance of the dried building material was examined. If it was homogeneous (no separation), apparently smooth and had no unevenness and cracks, it was found to be good (rated OK in table 3).

If the pH of the dispersion is greater than 4, processing is impossible (see dispersion powder xii) in table 3). If the spraying aid does not comprise any polymer having sulfonic acid groups, processing is impossible (see dispersion powders xi) and viii) in table 3). Furthermore, good processing

TABLE 2

| Constituents (by weight) | Ref. Ex. 1 | Ex. 2 | Ex. 3 | Ex. 4 | Ref. Ex. 5 | Ex. 6 | Ex. 7 | Ref. Ex. 8 | Ref. Ex. 9 |
|---|---|---|---|---|---|---|---|---|---|
| CEM II/B-S 32, 5R | 150 | 150 | 150 | 150 | 150 | 150 | 150 | 150 | 150 |
| Calcium aluminate cement (HAC) | 80 | 80 | 80 | 80 | 80 | 80 | 80 | 80 | 80 |
| Quartz sand | 465 | 465 | 465 | 465 | 465 | 465 | 465 | 465 | 465 |
| Ground limestone (CaCO$_3$) | 20 | 20 | 20 | 20 | 20 | 20 | 20 | 20 | 20 |
| Microsilica | 5 | 5 | 5 | 5 | 5 | 5 | 5 | 5 | 5 |
| Sand | 20 | 20 | 20 | 20 | 20 | 20 | 20 | 20 | 20 |
| Dispersion powder (styrene-acrylate copolymer) | 250 | | | | | | | | |
| Dispersion powder ii) | | 250 | | | | | | | |
| Dispersion powder xiii) | | | 250 | | | | | | |
| Dispersion powder i) | | | | 250 | | | | | |
| Dispersion powder xi) (ref. ex.) | | | | | 250 | | | | |
| Dispersion powder xv) | | | | | | 250 | | | |
| Dispersion powder xvii) | | | | | | | 250 | | |
| Dispersion powder viii) (ref. ex.) | | | | | | | | 250 | |
| Dispersion powder xii) (ref. ex.) | | | | | | | | | 250 |
| Powder defoamer | 5 | 1 | 1 | 1 | 1 | 1 | 1 | 1 | 1 |
| Acrylate powder thickener | 1.25 | 1.25 | 1.25 | 1 | 0 | 1 | 1 | 0 | 0 |
| Na gluconate | 2 | 1.25 | 0 | 1.5 | 1.5 | 1.5 | 2.25 | 1.5 | 1.5 |
| Citric acid | 0.75 | 0.75 | 0 | 0.75 | 0.75 | 0.75 | 1.125 | 0.75 | 0.75 |
| Total | 1000 | 1000 | 1000 | 1000 | 1000 | 1000 | 1000 | 1000 | 1000 |
| Water | 250 | 250 | 250 | 250 | 250 | 250 | 250 | 250 | 250 |

The pot life of the above-described dispersion-modified mineral building material mixture was assessed. The pot life is the use period within which the polymer-modified building material in the made-up state has a viscosity and creaminess appropriate for processing, such that it can be applied to the application substrate with a suitable aid (brick trowel, squeegee, etc.). If this period is exceeded, the building material can no longer be spread smoothly on the application substrate. A pot life of 0.5-2 h is desirable, whereas faster systems are difficult to process and extremely slow systems (pot life >3 h) delay the next working steps.

is possible only when the spraying aid is based on at least one allylic monomer comprising at least one sulfonic acid group.

TABLE 3

| Properties of the building material composition | | | |
|---|---|---|---|
| Composition | RDP used | Appearance | Pot life |
| Ex. 4 | i) | OK | 50 min |
| Ex. 2 | ii) | OK | 50 min |

TABLE 3-continued

Properties of the building material composition

| Composition | RDP used | Appearance | Pot life |
|---|---|---|---|
| Ref. ex. 8 | viii) (ref. ex.) | Processing not possible | |
| Ref. ex. 5 | xi) (ref. ex.) | Processing not possible | |
| Ref. ex. 9 | xii) (ref. ex.) | Processing not possible | |
| Ex. 3 | xiii) | OK | 2 h |
| Ex. 6 | xv) | OK | 2 h |
| Ex. 7 | xvii) | A few cracks | 2 h |

The invention claimed is:

1. A process comprising:
   (1) mixing, to obtain a first aqueous dispersion, at least
      (i) a second aqueous dispersion, where the second aqueous dispersion comprises particles, where the particles comprise at least one polymer I, where the at least one polymer I comprises monomer units formed from at least one ethylenically unsaturated monomer; and
      (ii) a polyacid II comprising monomer units formed from methyl-2-propene-1-sulfonic acid,
   and
      at least one further ethylenically unsaturated monomer selected from the group consisting of acrylic acid, methacrylic acid, maleic acid, itaconic acid, salts thereof, and mixtures thereof; and
   wherein, in (1), an additive comprising a polyoxyalkylene group is present, wherein the additive is
      (a) mixed as a further component in the mixing, or
      (b) applied by emulsion polymerization to a surface of the particles prior to the mixing, or
      (c) incorporated as a monomer unit into the at least one polymer I of the particles prior to the mixing;
   and wherein the first aqueous dispersion has a pH of <4; and
   (2) drying the first aqueous dispersion in order to obtain the redispersible dispersion powder.

2. The process of claim 1, further comprising
   (3) mixing the redispersible dispersion powder with an antiblocking agent.

3. The process of claim 1, wherein the first aqueous dispersion has a pH of <3.

4. The process of claim 1, wherein the at least one polymer I comprises monomer units formed from at least one ethylenically unsaturated monomer selected from the group consisting of ethylene, propylene, butadiene, styrene, vinyl acetate, vinyl chloride, vinyl ethers, vinyl esters, acrylic esters, methacrylic esters, and mixtures thereof.

5. The process of claim 1, wherein the at least one polymer I is selected from the group consisting of
   (ia) styrene-(meth)acrylate copolymers,
   (ib) styrene-butadiene copolymers,
   (ic) (meth)acrylate copolymers, and
   (ic) ethylene-vinyl acetate copolymers.

6. The process of claim 1, wherein the polyacid II comprises monomer units formed from the ethylenically unsaturated monomers acrylic acid or methacrylic acid.

7. The process of claim 1, wherein, in (a) and (b), the additive comprising the polyoxyalkylene group is selected from the group consisting of polyoxyalkenylated (C6-C22) alcohols, (C6-C30) carboxylic acids, (C6-C30)alkylamines, sorbitan esters, triglycerides or alkylphenols, and
   in (c), the additive comprising the polyoxyalkylene group is incorporated into the at least one polymer I as a polyoxyethylenated ethylenically unsaturated monomer.

8. A redispersible dispersion powder obtainable by the process of claim 1.

9. An aqueous dispersion obtainable by step (1) of the process of claim 1.

10. A building material composition comprising
   a redispersible dispersion powder obtainable by the process of claim 1 and/or
   an aqueous dispersion obtainable by step (1) of the process of claim 1.

* * * * *